United States Patent [19]

Tanigawa et al.

[11] 3,974,017

[45] Aug. 10, 1976

[54] METHOD OF ASSEMBLING A FLAT PLATE TYPE ROTARY TRANSFORMER

[75] Inventors: Shizuhiko Tanigawa, Moriguchi; Yoshinori Yamazoe, Abeno; Chihiro Nakamura, Moriguchi, all of Japan

[73] Assignee: Matsushita Electric Industrial Co., Ltd., Kadoma, Japan

[22] Filed: July 2, 1974

[21] Appl. No.: 485,134

[30] Foreign Application Priority Data

July 12, 1973 Japan .............................. 48-79160
July 16, 1973 Japan .............................. 48-85346[U]

[52] U.S. Cl. .............................. 156/309; 29/602 R; 156/64; 335/266

[51] Int. Cl.[2] .............................. C09J 5/00

[58] Field of Search .............. 29/602, 603; 156/309, 156/580; 335/266

[56] References Cited

UNITED STATES PATENTS 3,804,319 4/1974 Piechocki .............................. 156/580

3,812,579 5/1974 Roes .............................. 29/603

*Primary Examiner*—Edward G. Whitby
*Attorney, Agent, or Firm*—Wenderoth, Lind & Ponack

[57] ABSTRACT

An apparatus utilizing a flat plate type rotary transformer which has a rotary member with a collar fixed thereon, a stationary member provided with a bearing, the rotary member being mounted on the stationary member through the collar and the bearing, a first magnet core which is securely held on the rotary member and a second magnet core which is securely held on the stationary member. The magnet cores respectively of the rotary member and the stationary member are securely set by using the surface between the rotary member and the stationary member at which the members touch as the reference level in securing the desired gap between them.

3 Claims, 6 Drawing Figures

METHOD OF ASSEMBLING A FLAT PLATE TYPE ROTARY TRANSFORMER

BACKGROUND OF THE INVENTION

1. Field of the Invention

This invention relates to a flat plate type rotary transformer, and more particularly pertains to a flat plate type rotary transformer in which the gap between the magnet core on the primary side and the magnet core on the secondary side is controlled so as to be a predetermined size with high accuracy.

2. Description of the Prior Art

A rotary transformer is characterized by its primary side magnet core and the secondary side magnet core being magnetically coupled without touching each other for which reason it is finding uses, for example, in rotary drum type magnet recording and playing devices, etc.

FIG. 1 is a longitudinal sectional view of a conventional flat plate type rotary transformer, in which magnet cores 1 and 2 are of magnetic material as, for example, ferrite; coils 3–6 are provided in the opposed faces of cores 1 and 2; lead wires 7–10 extend from the aforementioned coils; and grooves 11 and 12 are provided in the opposed faces between the coils for the prevention of interference. As a current is caused to flow in the coil 3, an induced current flows in the coil 4, and likewise, current in coil 5 induces a current in the coil 6. Because the magnetic circuit includes a clearance having a large magnetic resistance as a part thereof, the rate of change of loss due to the clearance, and thus a decrease in the transmission efficiency, is very large, as shown in FIG. 2.

Accordingly, to obtain a rotary transformer with uniform characteristics, it is quite essential to establish the desired gap between the two magnet cores with a high degree of accuracy.

SUMMARY OF THE INVENTION

OBJECTS OF THE INVENTION

The aforementioned difficulties have been completely solved by this invention.

The first object of this invention is to provide an apparatus utilizing a flat plate type rotary transformer in which the gap between the magnet core on the primary side and the magnet core on the secondary side is given the desired size with high accuracy.

The second object of this invention is to provide a high precision assembling method for a magnet core for a flat plate shape rotary transformer, which method does not rely on the dimensional accuracy of the magnet core.

These objects are achieved according to the present invention by a flat plate type rotary transformer, which comprises a rotary supporting member having a contact surface thereon, a stationary supporting member having a bearing thereon, the rotary member being rotatably mounted on the stationary member with the contact surface contacting the bearing in the manner for supporting the load of the rotary member by the bearing, a first magnet core securely held on the rotary member with the surface of the magnet core facing away from the rotary member at a position ranging from a position level with the contact surface and a position spaced toward the rotary member from the contact surface in the direction of the gap dimension of the rotary transformer, and a second magnet core securely held on the stationary member with the surface of the magnet core facing away from the stationary member at a position ranging from a position level with the bearing surface contacted by said contact surface and a position spaced toward the stationary member from the contact surface in the direction of the gap dimension of the rotary transformer, at least one of said magnet cores being spaced from the respective contact surface and bearing surface.

The objects are further achieved by a method of mounting a magnetic core for the flat plate type rotary transformer on a bonding surface of a supporting member of the transformer having a datum surface thereon, the method comprising the steps of placing the magnetic core on the bonding surface of the supporting member with an adhesive between the magnetic core and the bonding surface with the surface of the magnet core on the opposite side from that in contact with the adhesive being a non-bonding surface, placing over the magnet core and the supporting member a position controlling plate having a position controlling surface and a position setting surface spaced from the position controlling surface at a predetermined distance in the direction of the gap dimension of the transformer with the position setting surface in contact with the non-bonding surface of the magnet core and the position controlling surface opposed to the datum surface on the supporting member, and urging the position controlling plate toward the supporting member until the position controlling surface contacts the datum surface of the supporting member, and maintaining the position controlling plate with the position controlling surface in contact with the datum surface while the adhesive hardens. The datum surface can be a surface extending around the peripheral edge of the supporting member and said position controlling surface can be around the peripheral edge of said position controlling plate. Where the supporting member comprises a base on which said bonding surface is provided and there is a collar extending upwardly from said base through the magnet core, the upper end surface of said collar can be the datum surface, and the position controlling plate can have a recess in the position setting surface, the bottom of said recess being the position controlling surface.

The objects of the invention are further achieved by a method of assembling magnet cores of the flat plate type rotary transformer, comprising the steps of, bonding a magnet core on a first supporting member having a datum surface thereon with the surface of the magnet core facing away from the supporting member positioned relative to the datum surface ranging from a position level with the datum surface to a position spaced toward the supporting member from the datum surface in the direction of the gap dimension of the rotary transformer, and bonding a magnet core on a second supporting member having a datum surface thereon with the surface of the magnet core facing away from the supporting member positioned relative to the datum surface ranging from a position level with the datum surface to a position spaced toward the supporting member from the datum surface in the direction of the gap dimension of the rotary transformer, at least one of the supporting members having the surface of the magnet core thereon which faces away from the supporting member spaced from the datum surface, and rotatably mounting the first supporting member on the second supporting member with the datum surface of the first supporting member and the datum surface of the second supporting member in contact with each other, whereby the spacing of the surface of the magnet cores from the datum surface defines the dimension of the gap of the rotary transformer. One of the supporting members can have a bearing thereon with a surface facing toward the other supporting member, and this lastmentioned surface can be the datum surface for said one supporting member.

In this method the step of bonding the magnet cores to the supporting members can be the same as that described above.

Only one of the supporting members need have the surface of the magnet core thereon which faces away from the supporting member spaced from the datum surface, and the surface of the magnet core on the other supporting member can be level with the datum surface. Alternatively, both of the supporting members can have the surface of the magnet core thereon which faces away from the supporting member spaced from the datum surface.

BRIEF DESCRIPTION OF THE DRAWINGS

Other objects and advantageous features of the present invention will become apparent from the following description of some embodiments thereof, taken together with the accompanying drawings, in which.

DETAILED DESCRIPTION OF THIS INVENTION

Figure 1:
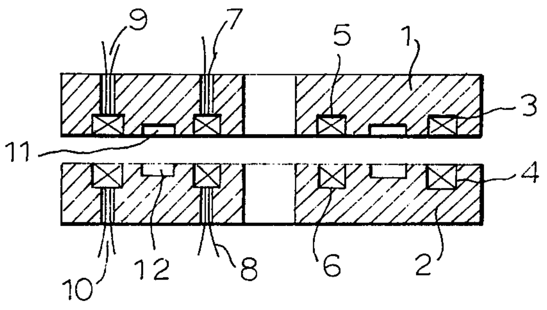
(PRIOR ART) FIG.1
FIG. 1 is a longitudinal section view of a conventional flat plate type rotary transformer.
Figure 2:
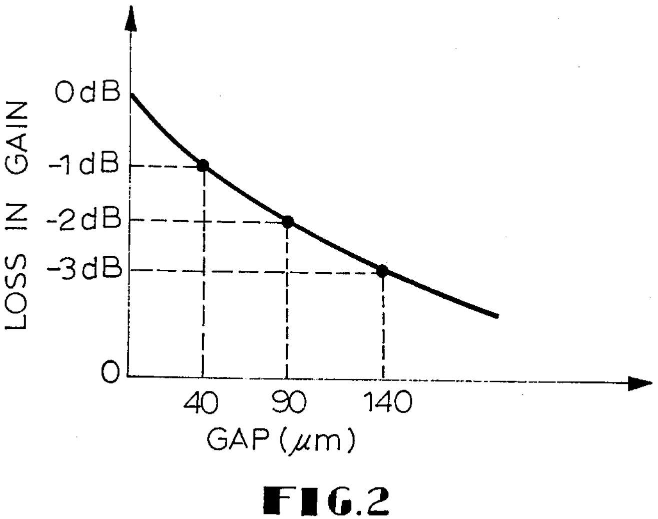
FIG. 2 is a characteristic graph showing the relationship between the gap between the two magnet cores and the loss in gain.
Figure 3:
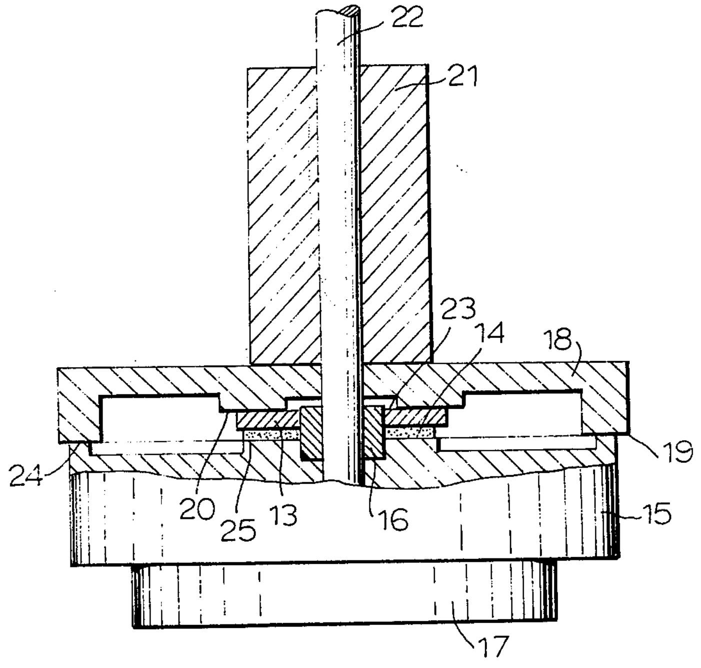
FIGS. 3 and 4 are side views, partly in section, of a magnet core for a flat plate type rotary transformer, in the process of being assembled by utilizing the assembling method of this invention.

FIG. 3 is a side view of magnet core for a flat plate type rotary transformer, which is bonded by utilizing the bonding method according to present invention. Referring to FIG. 3, there is provided a magnet core 13 for the flat plate shape rotary transformer (hereinafter referred to as the magnet core). An adhesive bonds the core 13 to, for example, a supporting member, which here is a rotary drum 15 of a rotary drum type magnetic recording and playing device (hereinafter referred to as the drum) having a drum supporting base 17, an outside circumferential surface 24 and a central bonding surface 25. A collar 16 mounted in the drum 15 extends up through the core 13. A shaft 22 extends from drum 13 through collar 16, controlling plate 18 and weight 21. The core 13 has a nonbonding surface 23.

In order to have the gap between the bonding surface 25 and the nonbonding surface 23 of the magnet core at an accurate distance the distance between the position controlling surface 19 of the position controlling plate 18 and the position setting surface 20 is given the required dimension for bonding the magnet core 13 onto the drum 15. Then, in conducting the bonding, first, the adhesive 14 is applied to the bonding surface 25 in a little greater amount than is required, and the magnet core 13 is placed on the adhesive 14. Then, the position controllıng plate 18 is positioned over the core 13 so that the position controlling surface 19 is in contact with the outer circumferential surface 24, and the position setting surface 20 is in contact with the nonbonding surface 23 of the magnet core. In this case, the outer circumferential surface 24 is used as a datum or reference level surface for setting the position of the magnet core. The bonding is completed by imposing the load of the weight 21 on the position controlling plate 18 to maintain this condition.

Since the distance between the bonding surface 25 and the nonbonding surface 23 of the magnet core is regulated by the position controlling plate 18, for example, any runout of the surface of the magnet core 13 of irregularity in the thickness of cores and all such other irregularities are taken up by means of the layer of the adhesive 14.

Figure 4:
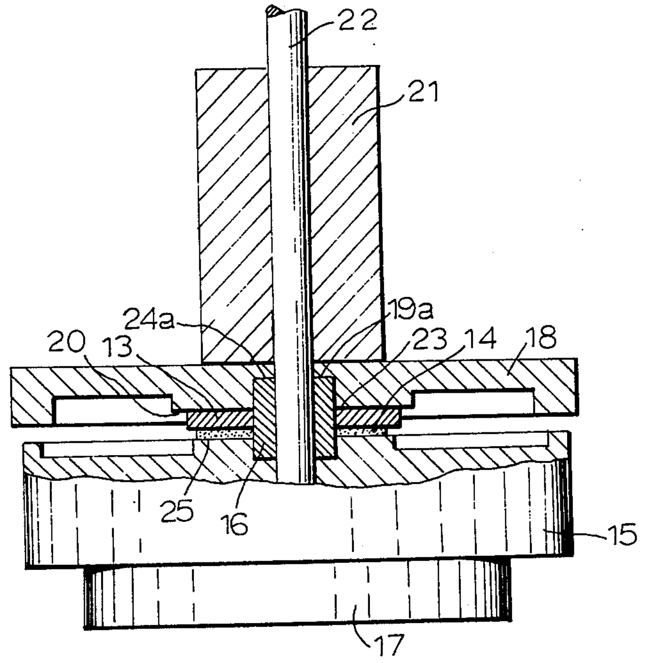

FIG. 4 shows the same embodiment as the embodiment of FIG. 3, but the datum surface on the rotary drum 15, instead of being the outer circumferential surface 24 of FIG. 3, is the top surface 24 on the collar 16 which is securely fixed on the rotary drum 15, and consequently, position controlling surface 19*a* on the position controlling plate is provided at the bottom of a recess in the central portion of the position controlling plate.

The collar 16 can be an oilless bearing.

Figure 5:
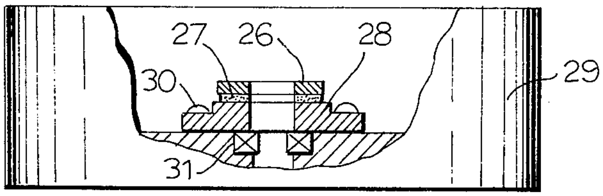
FIG. 5 is a side view, partly in cross section, of a magnet core for a flat plate type rotary transformer according to this invention.

FIG. 5 shows an embodiment of a magnet core constructed according to this invention obtained by an alternative method used when direct bonding as described above is impossible for the reason, say, that the construction of the object to be bonded is complex. Referring to FIG. 4, a magnet core 26 is bonded by adhesive 27 to a supporting member in the form of a magnet core supporting plate 28, which in turn is secured to a drûm 29 for a rotary drum type magnetic recording and playing device, for example, by screws 30. A bearing 31 is provided under the supporting plate 28. The magnet core 26 is bonded onto the supporting plate 28 in the specified dimensional relationship, say, by the above described method or like methods, thereby constituting a so-called magnet core unit. This magnet core unit is mounted on the drum 29 by means of the screws 30, thereby forming the drum unit.

As described in the foregoing, according to this invention, merely by providing for accuracy of the distance between the surfaces of the position controlling plate, it is possible to control the bonding accuracy by the thickness of the adhesive layer, doing away with the need to care about the differences in the thickness of the different magnet cores, the run-out of its surface or like irregularities.

Figure 6:
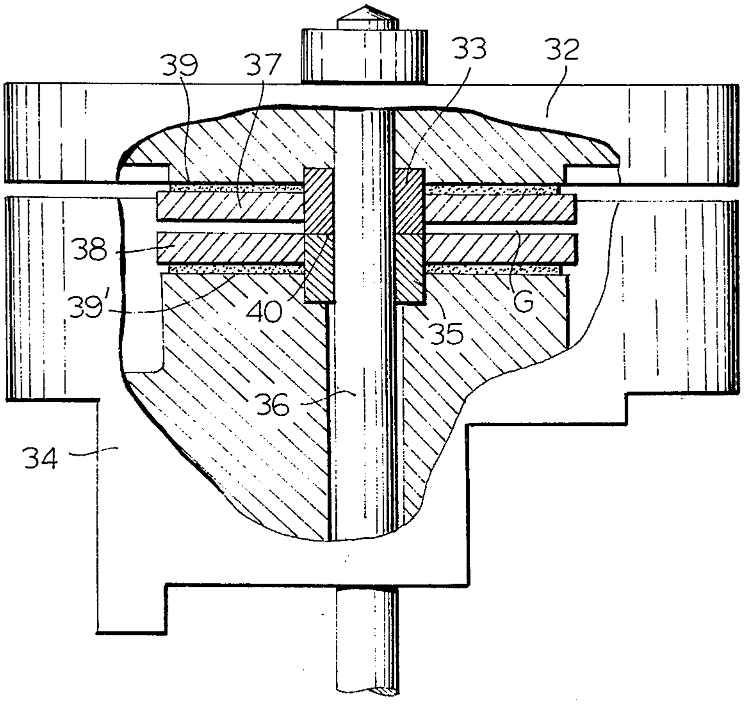
FIG. 6 is a side view, partly in section, of an apparatus having a flat plate type rotary transformer according to this invention.

FIG 6 shows an apparatus having magnet cores for a flat plate type rotary transformer, which magnet cores are bonded by the aforementioned bonding method.

Referring to FIG. 6, a rotary member 32, such as the rotary drum, for example in a rotary drum type magnetic recording and playing device has a collar securely held thereon, and a stationary member 24 such as the stationary drum in the aforementioned magnetic recording and playing device has a bearing 35 fixed thereon to support the load of the rotary member 32 by supporting contact with the collar 33. A rotary shaft 36 extends through the center of the stationary member and securely holds the rotary member 32 thereon. On the rotary member 32 and the stationary member 34, the magnet cores 37 and 38 which form the principal part of the flat plate type rotary transformer are immovably mounted respectively by means of adhesive 39 and 39', and it is the characteristic feature of this apparatus that it provides the desired gap between these two magnet cores 37 and 38 with high accuracy and by a simple means.

Thus, the stationary magnet core 38 is bonded onto the stationary member level with the surface 40 of the bearing 35, which is the surface contacted by collar 33, as the reference level, the rotary magnet core 37 facing this stationary magnet core is adhesively secured to the rotary member 32 with the downwardly facing non-bonding surface at a distance above the lower surface of the collar 40, which is also at the reference level so as to leave the desired gap G between the cores. By the simple means of using the contacting surfaces of the rotary member and the stationary member as the reference level, it is possible to secure the desired gap between the magnet cores 37 and 38 with high accuracy. In the above described embodiment, the stationary magnet core 37 is at the same level as the reference level, but it is also possible to place the rotary magnet core 38 at the same level as the reference level, and place the stationary magnet core 38 at the definite distance downward from this reference level, or to position the respective magnet cores above and below the reference level at distances sufficient to produce the desired gap between them when the rotary member and the stationary member are finally assembled.

Thus, in the apparatus, the positions of the respective rotary and stationary magnet cores are securely set by using the contacting surfaces of the rotary member and the stationary member as the reference level to produce the desired gap between them. Because of the high accuracy of the gap between these two magnet cores, the differences in the size of the gap between these two magnet cores from one apparatus to the other is small, making for uniform and stable characteristics, even in a mass-production process for securely mounting the magnet cores separately on the stationary member and the rotary member, respectively.

The embodiments of the invention in which exclusive property or privilege is claimed are defined as follows:

1. A method of mounting a magnetic core for a flat plate type rotary transformer on a bonding surface of a supporting member of the transformer having a datum surface thereon, which comprises the steps of:

a. placing the magnetic core on the bonding surface of the supporting member with an adhesive between the magnetic core and the bonding surface with the surface of the magnet core on the opposite side from that in contact with the adhesive being a non-bonding surface;

b. placing over the magnetic core and the supporting member a position controlling plate having a position controlling surface and a position setting surface spaced from the position controlling surface at a predetermined distance in the direction of the gap dimension of the transformer with the position setting surface in contact with the non-bonding surface of the magnetic core and the position controlling surface opposed to the datum surface on the supporting member; and c. urging the position controlling plate toward the supporting member until the position controlling surface contacts the datum surface of the supporting member, and maintaining the position controlling plate with the position controlling surface in contact with the datum surface while the adhesive hardens.

2. A method as claimed in claim 1 in which the datum surface is a surface extending around the peripheral edge of the supporting member and said position controlling surface is around the peripheral edge of said position controlling plate.

3. A method as claimed in claim 2 in which the supporting member comprises a base on which said bonding surface is provided and a collar extending upwardly from said base through the magnetic core, the upper end surface of said collar being said datum surface, and said position controlling plate has a recess in the position setting surface, the bottom of said recess being the position controlling surface.

* * * * *